G. A. KNOBLOCK.
SEEDER.
APPLICATION FILED JUNE 11, 1908.
938,492.
Patented Nov. 2, 1909.
2 SHEETS—SHEET 1.
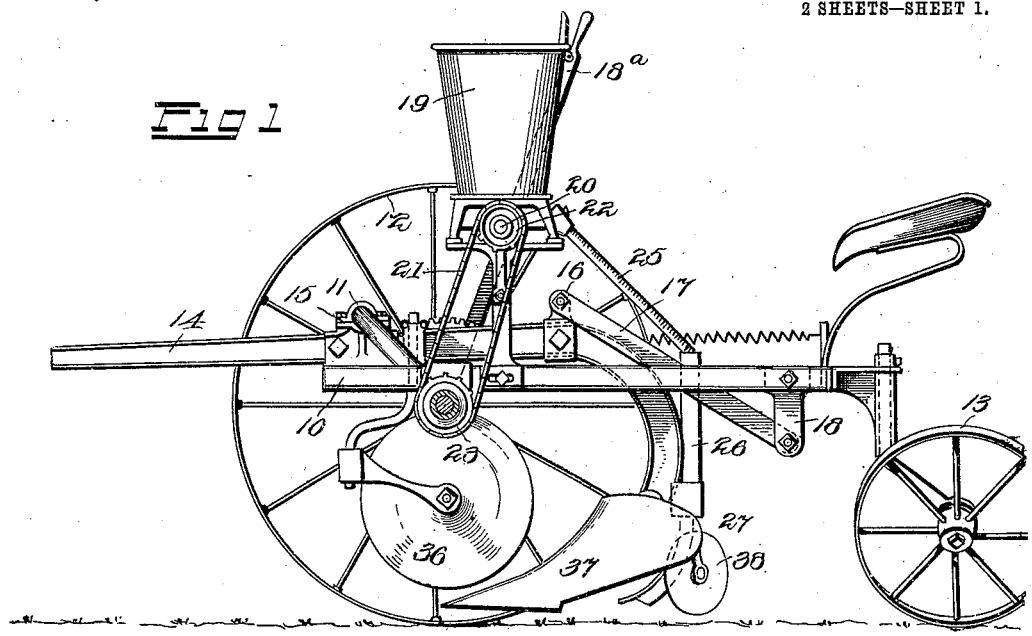
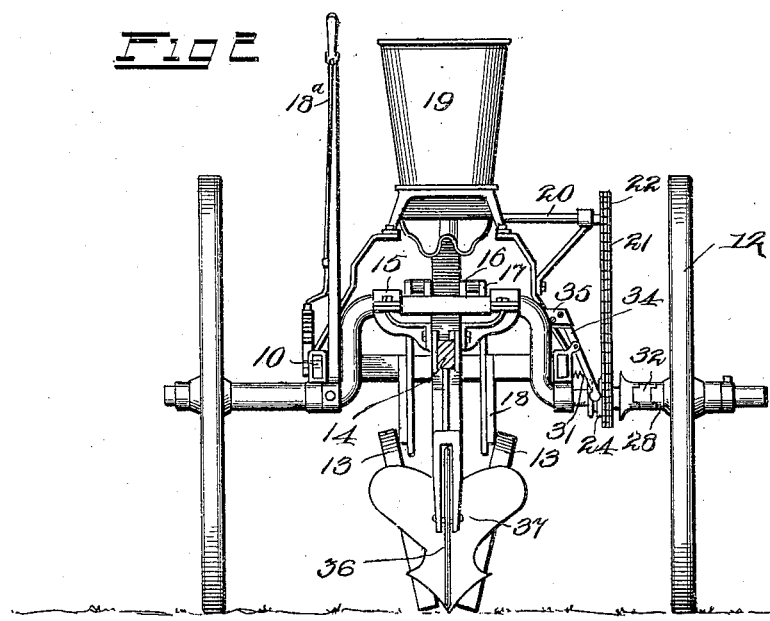
Witnesses
Inventor
George A. Knoblock
By J. Dushane
His Attorney

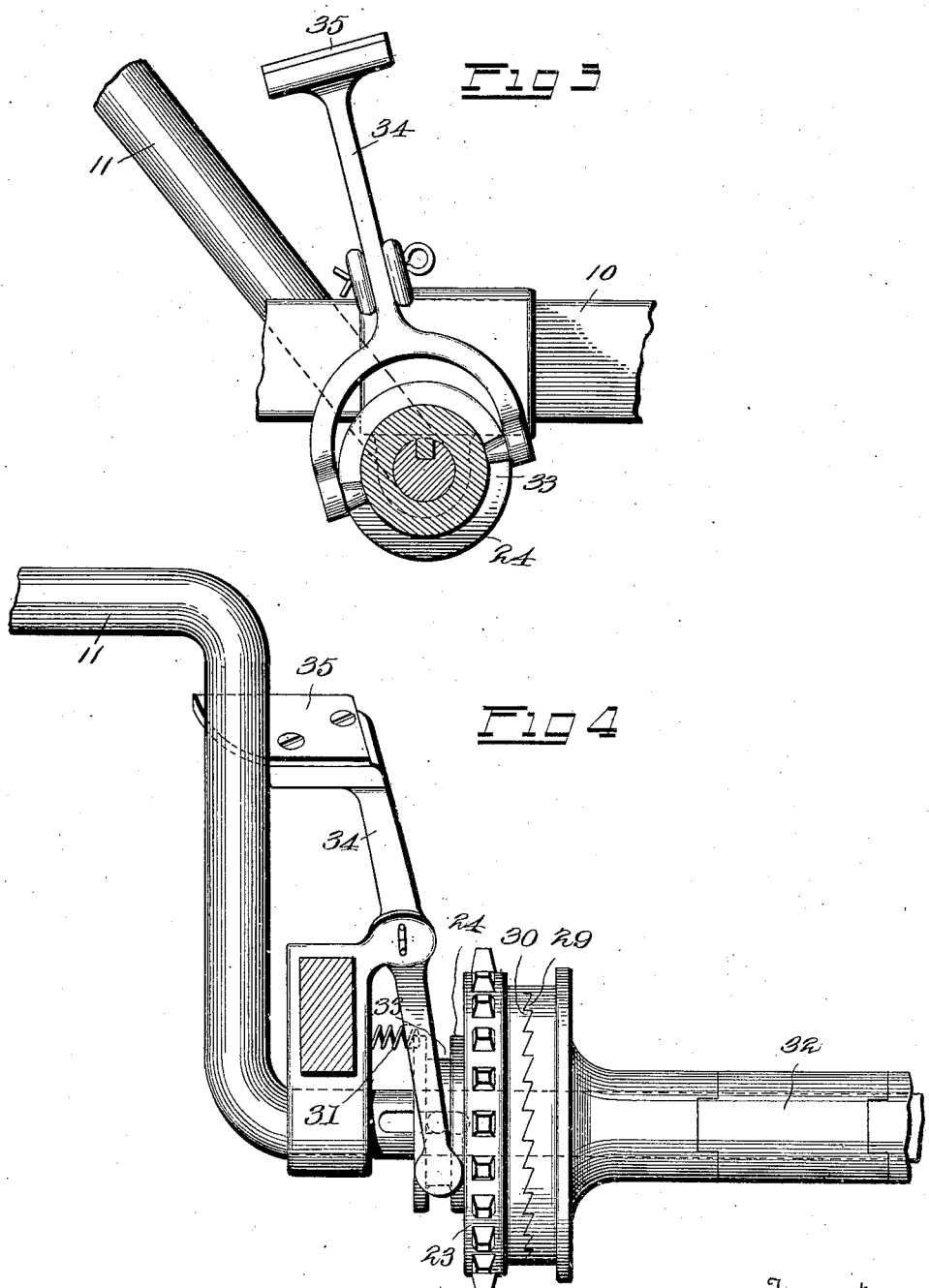

UNITED STATES PATENT OFFICE.

GEORGE A. KNOBLOCK, OF SOUTH BEND, INDIANA.

SEEDER.

938,492.     Specification of Letters Patent.     Patented Nov. 2, 1909.

Application filed June 11, 1908. Serial No. 437,887.

*To all whom it may concern:*

Be it known that I, GEORGE A. KNOBLOCK, a citizen of the United States, residing at South Bend, in the county of St. Joseph and State of Indiana, have invented certain new and useful Improvements in Seeders, of which the following is a specification.

This invention relates to certain new and useful improvements in seeders.

The invention has for its object the production of an implement of this character by means of which a furrow may be opened, the seed deposited and the furrow closed, all by one mechanism operating in a series of successive steps.

A further object is to provide improved means for supporting the lister plow.

A further object is to provide means for raising the lister plow into an inoperative position and to simultaneously and automatically throw the seed feeding mechanism out of gear.

A further object is to provide means for automatically disconnecting the seeder mechanism when backing or turning.

The invention will be hereinafter fully set forth and particularly pointed out in the claims.

In the accompanying drawings—Figure 1 is a side elevation of the machine, one wheel being removed. Fig. 2 is a view in front elevation of the seeder. Figs. 3 and 4 are detail views showing the mechanism for controlling the seed operating devices.

Like characters of reference designate corresponding parts.

Referring to the accompanying drawings, 10 designates a frame composed of side bars and supported at the forward end by a bent or inverted U-shaped axle 11, which in turn is carried by suitable traction wheels 12. The rear end is supported by covering wheels 13 hereinafter referred to.

The beam 14 of the lister plow is pivotally supported by clips 15 secured to the central portion of axle 11 and the rear portion of said beam is pivotally connected at 16 to the contiguous upper ends of links 17, the opposite ends of which are supported by ears 18 depending from frame 10. A lever 18ª is arranged to adjust the axle 11 as required.

The seeder box 19 is supported in any suitable manner and provided with a feeder shaft 20 rotated through the medium of a sprocket chain 21, and sprockets 22—23, the latter being provided with a hub 24 mounted on axle 11. From box 19 leads a flexible tube 25 which discharges into a rectangular tube 26 attached to the plow beam 14 and provided with coverers 27. The hub 28 of wheel 12 is provided with clutch teeth 29 which are adapted to engage similar teeth 30 on hub 24, said hubs being normally held in engagement by a spring 31. If desired, a spacing section 32 may be employed, whereby by placing the same to one side or the other of the wheel, the traction wheels may be adjusted for different widths to conform to the rows.

The hub 24 is provided with a groove 33 to receive the forked end of a lever 34 pivoted to frame 10 by an offsetting stud, and terminating at its upper end in a flat, cam-shaped plate 35 which projects across the path of one of the vertical legs of axle 11.

The double mold board plow 37 follows a rolling colter 36, and immediately back thereof are located covering disks 38. The wheels 13 are inclined and so arranged that they will pack the earth over the grain covered by disks 38.

In operation the action of the parts is as follows:—Assuming that the furrow opening devices are dropped into the ground, the colter will cut the ground, the plow will spread it, and make the furrow into which the seed is dropped in the well known manner, after which the seed is covered by disks 38 and the loose earth packed down by wheels 13. When it is desired to discontinue operations or to transport the implement, the cranked portion of axle 11 is raised, bringing up the forward end of plow beam 14 and drawing it rearwardly, whereupon the links 17 raise the plowshare and its adjuncts out of the ground, and high enough to clear it. As the vertical part of the crank shaft 11 turns backward, it strikes the edge of cam plate 35, and forces lever 34 to swing on its pivot, thus withdrawing hub 24 from engagement with hub 28 and throwing the seeder mechanism out of operation.

From the foregoing description it is evident that in backing up, (because of the inclined teeth of the hubs 24 and 28, and the spring 31), that hub 24 will remain idle, allowing the teeth of hub 28 to slide past. Thus the seeder is automatically rendered inoperative when the plow is not working, either during transportation or in backing up to avoid an obstacle, or in turning.

I claim as my invention:—

1. A seeder comprising a frame, an inverted U-shaped axle mounted therein, traction wheels mounted on the axle, means carried by the axle for supporting a plow, means for adjusting the cranked portion of the axle to raise and lower the plow, a seed-depositing mechanism operable from the axle, a clutch on the axle controlling said seed-depositing mechanism, an operating lever pivoted to said frame with its lower end engaging the movable member of the clutch, the upper end of the lever having a transversely extended flattened portion with a cam face rigid therewith at a right angle thereto and projected across the path of one of the vertical legs of said axle.

2. A seeder comprising a frame, an inverted U-shaped axle mounted therein, traction wheels mounted on the axle, means carried by the axle for supporting a plow, means for adjusting the cranked portion of the axle to raise and lower the plow, a seed-depositing mechanism operable from the axle, a clutch on the axle controlling said seed-depositing mechanism, an operating lever pivoted to said frame with its lower end engaging the movable member of the clutch, the upper end of the lever having a transversely extended flattened portion with a cam face rigid therewith at a right angle thereto and projected across the path of one of the vertical legs of said axle, and means interposed between the frame and the said clutch below the pivot of the lever for normally holding the clutch in engagement.

3. A seeder comprising a frame, an inverted U-shaped axle mounted therein, traction wheels mounted on the axle, a beam pivotally supported by means secured to the central portion of said axle, rearwardly and downwardly inclined links pivotally connected at their upper ends to the rear end of said beam, ears depending from said frame and in which the rear ends of said links are pivoted, a lever for adjusting said axle, a double mold board plow carried by said beam, a rolling colter in front of said plow, covering disks immediately at the rear of said plow, a clutch mechanism on the axle, a lever pivotally mounted for actuating the same, and a horizontal cam-shaped plate carried by the upper end of said lever in the path of one of the vertical legs of the said axle whereby as the crank axle is raised to draw the forward end of the plow out of the ground said vertical leg will turn backward and strike the edge of said cam plate to swing said lever on its pivot to actuate the clutch mechanism.

In testimony whereof I affix my signature, in presence of two witnesses.

GEORGE A. KNOBLOCK.

Witnesses:
A. N. STAMM,
ADOLPH S. GINZ.